(12) United States Patent
Raab et al.

(10) Patent No.: US 9,457,332 B2
(45) Date of Patent: Oct. 4, 2016

(54) REACTOR

(71) Applicant: Tantec GmbH, Hanau (DE)

(72) Inventors: Georg Raab, Hanau (DE); Knut Boeminghaus, Oberursel (DE)

(73) Assignee: TANTEC GMBH, Hanau (DE)

( * ) Notice: Subject to any disclaimer, the term of this patent is extended or adjusted under 35 U.S.C. 154(b) by 13 days.

(21) Appl. No.: 14/200,573

(22) Filed: Mar. 7, 2014

(65) Prior Publication Data

US 2014/0255266 A1 Sep. 11, 2014

(30) Foreign Application Priority Data

Mar. 8, 2013 (EP) ..................................... 13001171

(51) Int. Cl.
*B01J 19/02* (2006.01)
*B01J 3/00* (2006.01)
*B01J 3/04* (2006.01)

(52) U.S. Cl.
CPC ................ *B01J 19/02* (2013.01); *B01J 3/006* (2013.01); *B01J 3/048* (2013.01); *B01J 2219/0236* (2013.01); *Y10T 29/49345* (2015.01)

(58) Field of Classification Search
CPC .............. B01J 19/02; B01J 3/00; B01J 3/04
USPC ............................................ 422/241; 29/890
See application file for complete search history.

(56) References Cited

U.S. PATENT DOCUMENTS 3,354,913 A * 11/1967 Goto ............................ 138/147
4,291,104 A 9/1981 Keifert
4,997,124 A 3/1991 Kitabatake et al.
6,010,669 A * 1/2000 Miola et al. .................. 422/241
6,267,289 B1 * 7/2001 Miola ........................... 228/119
6,412,684 B1 * 7/2002 Miola ......................... 228/141.1
6,878,212 B1 4/2005 Pinatti et al.
2007/0140935 A1 * 6/2007 Hazlebeck .................... 422/241

FOREIGN PATENT DOCUMENTS

| DE | 37 43 820 | 7/1988 |
| DE | 37 20 603 | 1/1989 |
| GB | 667 347 | 2/1952 |
| JP | 63-038574 | 2/1988 |
| JP | 2003-502395 | 1/2003 |
| JP | 2005-090677 | 7/2005 |

OTHER PUBLICATIONS

Translation of JP-63/038574.*
Frey et al., "Recent Successes in Tantalum Clad Pressure Vessel Manufacture: A New Generation of Tantalum Clad Vessels," Proceedings of Corrosion Solutions Conference, 2003, XP055068667, (URL: http://dynamicmaterials.com/jdownloads/White%20Papers/3-paper22_frey_040402.pdf) pp. 163-169.
European Action conducted in counterpart European Appln. No. 13 00 1171 (Jul. 8, 2013).
Japanese Action conducted in counterpart Japan Appln. No. 2014-045461 (Jun. 2, 2015).

* cited by examiner

*Primary Examiner* — Huy-Tram Nguyen
(74) *Attorney, Agent, or Firm* — Greenblum & Bernstein, P.L.C.

(57) ABSTRACT

Reactor and method of forming reactor that includes at least one wall section having an inner surface bounding an interior space, a lining arranged on the inner surface of the at least one wall to face the interior space, and at least one fluid connection, to which a negative pressure is appliable, that is structured to run through the at least one wall section to open into a space between the inner surface and the lining.

27 Claims, 1 Drawing Sheet

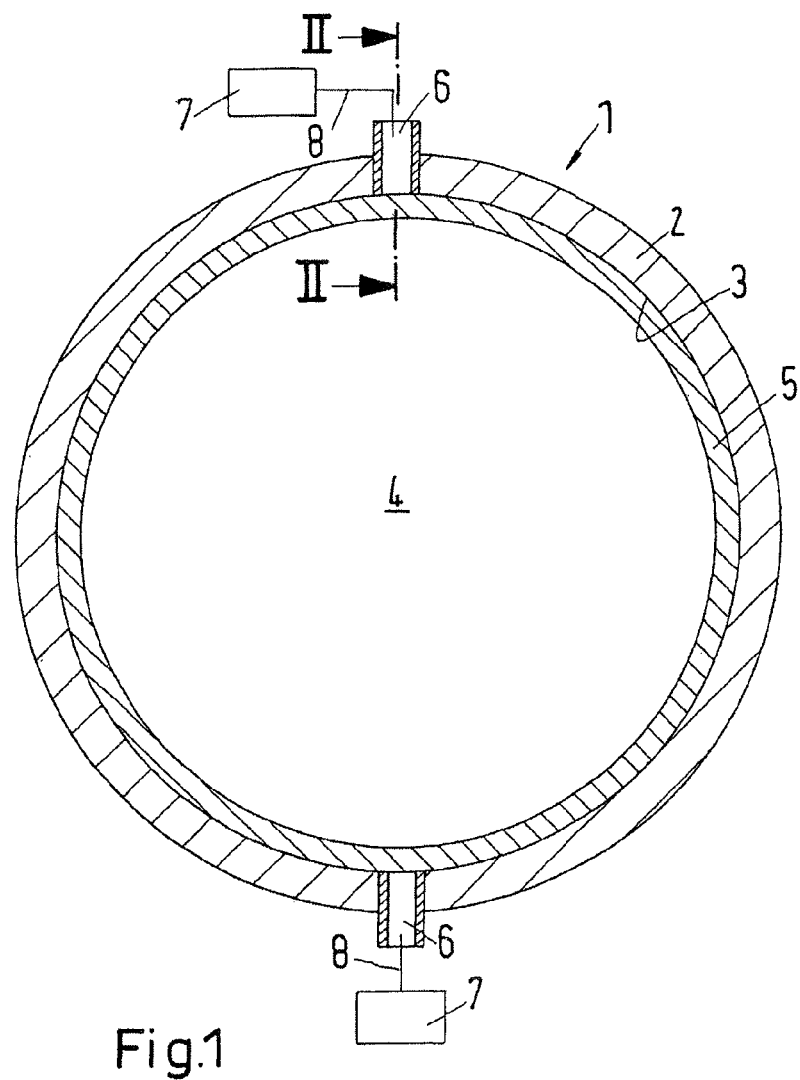
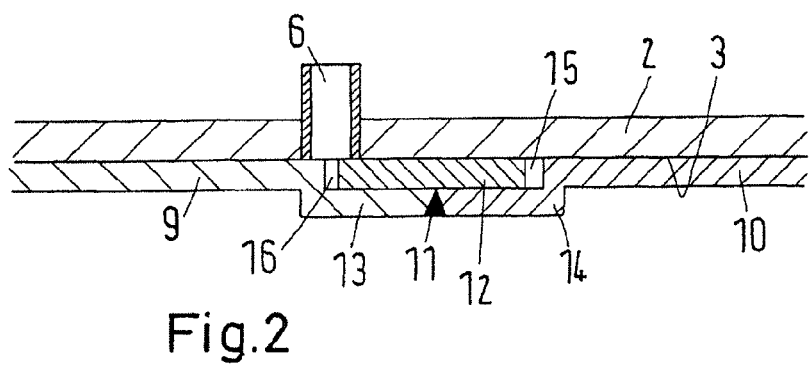
Fig.1
Fig.2

REACTOR

CROSS-REFERENCE TO RELATED APPLICATIONS

The present application claims priority under 35 U.S.C. §119 of European Patent Application No. 13 001 171.1, filed Mar. 8, 2013, the disclosure of which is expressly incorporated by reference herein in its entirety.

BACKGROUND OF THE EMBODIMENTS

1. Field of the Invention

Embodiments of the invention relate to a reactor with at least one wall section bounding an interior space. The wall section is provided with a lining on its inner surface facing the interior space.

2. Discussion of Background Information

In a reactor of the type generally discussed above, chemicals that are to react with one another can be stored in the interior space. However, a reactor can also to be understood as an arrangement through which the chemicals are conducted, e.g., in the form of a liquid and/or gaseous stream. The term "reactor" thus can also include a column and a container here.

The wall section forms a part of a wall which bounds the interior space. The wall section can also form the entire wall. The wall section provides a mechanical stability so that the forces produced during the through-conducting of the chemicals or during the storage of the chemicals, possibly during an occurring reaction, can be absorbed by the wall section.

For many chemicals, however, there is the risk that they attack the material from which the wall section is formed, for example, by corrosion. In this case, a lining is necessary which separates the interior space from the inner surface of the wall section and thus protects the interior space. The lining is resistant against the chemicals provided.

If the lining is formed from an expensive material, it is desirable to make the lining as thin as possible. The thickness of the lining is then adapted to the protection of the material of the wall section. This is unproblematic as long as the interior space is under atmospheric pressure or under an excess pressure. An excess pressure is absorbed by the wall section when the lining is pressed against the wall section by the excess pressure.

However, a problem arises when a reduced pressure, that is, a pressure below the pressure of the atmosphere, occurs in the interior space. In this case, the lining can be pulled off of the inner surface. Mechanical stresses for which the lining is not designed are often hereby produced. The lining is then damaged such that the protective effect is no longer ensured and the wall section is attacked by the chemicals.

A connection between the lining and the wall section, for example, by soldering, requires a relatively large amount of work. Another type of connection, such as explosive cladding, requires a relatively large amount of lining material and is therefore likewise relatively expensive.

SUMMARY OF THE EMBODIMENTS

Embodiments of the invention are directed to a reactor suitable for a reduced pressure in the interior space.

According to embodiments, a reactor of the type named at the outset includes at least one fluid connection to which a reduced pressure can be applied that runs through the wall section, which connection opens between the inner surface and the lining.

A reduced pressure is applied to the fluid connection during operation of the reactor, for example, by connection to a "vacuum pump." The reduced pressure propagates through the fluid connection into the gap between the inner surface and the lining and can then spread further in the gap between the inner surface and the lining. The negative pressure between the inner surface and the lining opposes a potential reduced pressure or negative pressure in the interior space and prevents the lining from being pulled away from the inner surface of the wall section. The negative pressure applied to the fluid connection does not even need to be controlled in a very precise manner. If the negative pressure at the fluid connection is greater than (or approximately equal to) the negative pressure in the interior space, then the lining is pressed against the wall section as a result of the pressure difference, which is harmless because the wall section can absorb the forces produced thereby without a problem.

Preferably, the lining bears against the inner surface. Even when the lining and the wall section bear against one another with a relatively precise fit, there always remains an adequate path through which the negative pressure can spread in the entire region between the lining and the wall section, even if no actual gap is present here. The roughness of the inner surface and/or the roughness of the side of the lining facing the inner surface is frequently sufficient to provide the necessary path for the negative pressure.

In a preferred embodiment, it is provided that the inner surface and the lining respectively have a cylinder shape. The inner surface and the lining are thus closed in a circumferential direction. The negative pressure, which is produced through the fluid connection in the region between the lining and the inner surface, can thus spread in a circumferential direction and ensure that the lining is always secured on the wall section over the entire circumference.

Here, it is preferred that the cylinder shape has a circular cross section. The wall section and the lining thus form a circular cylinder, which has the advantage that no impeding corners and edges occur here.

Preferably, the lining has a thickness of maximally 1 mm. The lining thus has a very low mechanical stability. The thickness is sufficient to protect the inner surface of the wall section from the chemicals in the interior space. A greater mechanical stability is also not required. Even a smaller thickness, for example 0.7 mm, is sufficient in many cases. With greater pressures in the interior space, the lining is pressed against the inner surface of the wall section. In the case of reduced pressures in the interior space, the negative pressure between the wall section and the lining secures the lining on the inner surface of the wall section.

Preferably, the lining has tantalum or a tantalum alloy (hereinafter referred to as "tantalum" in short) as a main component. Tantalum is sufficiently resistant against most chemicals. However, tantalum is relatively expensive so that the costs for the reactor can be kept within acceptable limits via a lower thickness of the tantalum lining, which can also be referred to as a "liner."

Preferably, the lining has at least two parts that are connected to one another by a connection seam. The fluid connection is arranged in the region of the connection seam. The negative pressure that is applied to the fluid connection can then propagate along the connection seam. Here, a somewhat larger clear cross section than in other regions between the inner surface and the lining is often available.

Here, it is preferred that the connection seam is embodied or formed as a weld seam. Two parts of the lining can then be welded to one another in order to seal the connection seam against the chemicals.

Here, it is preferred that a protective strip is arranged between the connection seam and the inner surface. In particular, when the lining is formed from a material such as tantalum as a main component, relatively high temperatures arise during the welding so that there exists the danger of the wall section being damaged during the production of the connection seam. This damage is prevented by a protective strip with high reliability.

This applies in particular when the protective strip is formed from the same material as the lining. If, for example, a lining having tantalum as a main component is used, then a protective strip having tantalum as a main component can also be used. Even if an additional connection between the two parts of the lining that are to be connected and the protective strip results during the production of the connection seam, the wall section is not affected.

Preferably, the linings and/or the wall section have a shaping in the region of the connection seam that forms a hollow space in which the protective strip is arranged. Among other things, this has the advantage that the protective strip can be held in position when the two parts of the lining are joined together. Thus, it is possible to ensure that the protective strip is located in the proper place when the connection seam is produced.

Here, it may be preferred that the protective strip has a distance from at least one boundary wall of the hollow space. This distance or gap further facilitates the spreading of the negative pressure from the fluid connection. Thus, a very uniform application of negative pressure to the lining from the inner surface of the wall section is achieved so that the risk of the lining being moved away from the wall section remains exceptionally small. As a result, the risk of damage to the lining is kept very small.

Embodiments of the invention are directed to a reactor that includes at least one wall section having an inner surface bounding an interior space, a lining arranged on the inner surface of the at least one wall to face the interior space, and at least one fluid connection, to which a negative pressure is appliable, that is structured to run through the at least one wall section to open into a space between the inner surface and the lining.

According to embodiments, the lining, under an applied negative pressure via the at least one fluid connection, can bear against the inner surface.

In accordance with embodiments, the inner surface and the lining may have cylinder shapes. Further, the cylinder shape can have a circular cross-section.

According to other embodiments of the invention, the lining can have a maximum radial thickness of 1 mm.

In embodiments, the lining may include tantalum. Further, tantalum can be a main component of the lining.

In accordance with still other embodiments, the lining may include at least two parts connected to one another by a connection seam. The fluid connection may be arranged in a region of the connection seam. Further, the connection seam can include a weld seam. Moreover, a protective strip can be arranged between the connection seam and the inner surface. The protective strip can be formed from a same material as the lining. At least one of the lining and the at least one wall section in a region of the connection seam may include a shaping structured to form a hollow space in which the protective strip is arranged. The protective strip can be arranged at a distance from at least one boundary wall of the hollow space.

Embodiments of the invention are directed to a method of forming a reactor. The method includes inserting a lining into an interior space bounded by at least one wall section having an inner surface, so that the lining is arranged on the inner surface of the at least one wall to face the interior space, and applying a negative pressure to a space between the inner surface and the lining via at least one fluid connection running through the at least one wall section.

According to embodiments, the lining can include tantalum. Further, the lining can have a maximum radial thickness of 1 mm.

In accordance with still yet other embodiments of the present invention, the lining can include at least two parts and the method may also include connecting the at least two parts to one another by a connection seam. Moreover, before connecting the at least two parts to one another, the method can include arranging a protective strip between the inner surface and a location for the connection seam. The method can also include forming a shaping in at least one of the lining and the at least one wall section in a region of the location for the connection seam to form a hollow space, and arranging the protective strip in the hollow space.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows a schematic cross section through a reactor; and

FIG. 2 shows a section II-II according to FIG. 1.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

A reactor 1, which is schematically illustrated in cross-section in FIG. 1, has a cylindrical wall 2 with an inner surface 3 that bounds an interior space 4. In the present illustrated embodiment, wall 2 is embodied or formed continuously in a circumferential direction, however, this arrangement is not absolutely necessary. That is, in place of a wall 2 that is continuous in a circumferential direction, it is also possible to use a different reactor in which only a wall section is provided.

Wall 2 is embodied or formed, e.g., from a steel, such as stainless steel. Wall 2 has a mechanical stability sufficient to absorb forces that are produced, e.g., by pressures or flows, in interior space 4.

Reactor 1 can also be referred to as a "column" or "container."

If liquids or gases that can attack or even destroy wall 2 are present in the interior space 4, it is normally necessary to provide a lining or liner 5 between interior space 4 and inner surface 3. In FIG. 1, lining 5 has been depicted in an exaggeratedly thick manner for ease is illustration and explanation. However, when viewed relative to the thickness of wall 2, lining 5 has a significantly smaller thickness. In this regard, the thickness of lining 5 can be in the order of magnitude of, e.g., 1 mm or less.

Similar to wall 2, lining 5 is embodied or formed as a circular cylinder in the present exemplary embodiment, i.e., it forms a hollow cylinder with a circular cross section.

Lining 5 is formed as a molded part, the outer diameter of which is adapted to the inner diameter of wall 2. Thus, lining 5 can slide into wall 2 with very little play. Although lining 5 then bears against inner surface 3, so that it is pressed against inner surface 3 of wall 2, when pressures occur in interior space 4, a deformation of lining 5 is not associated therewith.

In the present exemplary embodiment, two fluid connections 6 are guided through wall 2, which are connected to a negative pressure production device (or "vacuum pump," for short) 7 that is only illustrated schematically. Of course, it is also possible to use only one single negative pressure production device 7 and connect this device to multiple fluid connections 6 via suitable lines 8. The two fluid connections 6 can be distributed in a circumferential direction. Multiple fluid connections 6 can also be provided in the longitudinal direction of wall 2, i.e., perpendicular to the drawing plane of FIG. 1. Each fluid connection 6 supplies a "negative pressure region." One or more negative pressure regions can be sealed against the outside, possibly also in groups.

Fluid connection 6 opens at inner surface 3, so as to open into a space or region between inner surface 3 and lining 5.

Even if lining 5 rests in or on wall 2 in a precisely fitting manner or with little play, the negative pressure that is produced at fluid connections 6 has the possibility of spreading over the entire circumference of lining 5 and in the longitudinal direction of wall 2, e.g., via an unavoidable roughness of inner surface 3 of wall 2 and/or a corresponding roughness of the outer surface of lining 5. Since essentially only one pressure must propagate, yet larger fluid streams are avoided, the negative pressure can also propagate when lining 5 bears against inner surface 3.

Negative pressure production devices 7 can be operated with a constant negative pressure without difficulty. If the pressure produced by negative pressure production devices 7 is absolutely lower than the pressure in interior space 4, then the pressure in interior space 4 presses lining 5 against inner surface 3 of wall 2 so that the same conditions are produced as in the case of an excess pressure in interior space 4. If the pressures in interior space 4 and at negative pressure producing device 7 are equal, lining 5 is kept bearing against inner surface 3 of wall 2 by its inherent stiffness. Thus, as long as the pressure in interior space 4 is not lower than the pressure of negative pressure production devices 7, lining 5 continues to bear against inner surface 3 of wall 2 so that a deformation of lining 5 can be reliably prevented.

A reactor illustrated in FIG. 1 often has a length, which is perpendicular to the drawing plane in FIG. 1, of several meters. In many cases, it is not possible to produce such a lining 5 with a corresponding length.

For this reason, lining 5 can be formed from at least two parts 9, 10 which are connected to one another by a weld seam 11 as a connection seam.

Lining 5, and therefore its parts 9, 10, have tantalum as a main component. In tantalum welding, relatively high temperatures in the order of 3,000° C. are required.

It can be recognized in FIG. 2 that fluid connection 6 is arranged in the region of weld seam 11. However, it is not required that fluid connection 6 covers weld seam 11. The possible distance between fluid connection 6 and weld seam 11 results from the following explanation.

In order to protect wall 2 from damage during welding, a protective strip 12 is arranged between wall 2 and weld seam 11. Protective strip 12 is formed from the same material as lining 5. Therefore, it is indeed possible to accept that a connection of the two parts 9, 10 to protective strip 12 also occurs during the production of weld seam 11, but an impingement or damaging of wall 2 does not occur.

Moreover, it is possible to use fluid connection 6 when producing the welded connection in order to introduce a shielding gas, such as argon.

In order to accommodate protective strip 12, the two parts 9, 10 have respectively a shaping 13, 14 which, together with wall 2, form a hollow space 15 in which protective strip 12 is arranged. Hollow space 15 keeps protective strip 12 in the desired position.

It is of course also possible that hollow space 15 is arranged in wall 2. For this purpose, wall 2 can have corresponding shapings. Hollow space 15 can also be formed by shapings in both wall 2 and lining 5, e.g., on the parts 9, 10.

It can be recognized that protective strip 12 does not completely fill hollow space 15, so that a gap 16 remains which is formed by a distance between the boundary wall of hollow space 15, which is formed by part 9 of lining 5, and protective strip 12, and through which fluid from fluid connection 6 can flow. Because gap 16 runs continuously in a circumferential direction, negative pressure can spread in a relatively quick and unimpeded manner through gap 16 in a circumferential direction. From gap 16, the negative pressure can then further spread in an axial direction of inner surface 3, i.e., the longitudinal direction of wall 2, so that lining 5 can be retained on inner surface 3 with the necessary reliability.

Multiple fluid connections 6 can be arranged along the longitudinal extension of wall 2 in order to design the negative pressure supply between inner surface 3 and lining 5 more uniformly over the length of reactor 1 or the column.

The arrangement operates in a self-regulating manner, as it were. If lining 5 is slightly pulled off of inner surface 3 of wall 2 by a negative pressure in interior space 4, negative pressure fed by fluid connection 6 can immediately propagate thereto and once again bring lining 5 to bear against inner surface 3. In this manner, a significant deformation of lining 5 that could lead to damage is avoided with high reliability.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A reactor comprising:
   at least one wall section having an inner surface bounding an interior space;
   a lining arranged on the inner surface of the at least one wall to face the interior space, wherein the lining comprises at least two parts connected to one another by a connection seam; and
   at least one fluid connection, which is connected to a negative pressure production device, being structured to run through the at least one wall section in a region of the connection seam to open into a space between the inner surface and the connection seam.

2. The reactor according to claim 1, wherein the lining, under an applied negative pressure via the at least one fluid connection, bears against the inner surface.

3. The reactor according to claim 1, wherein the inner surface and the lining have cylinder shapes.

4. The reactor according to claim 3, wherein the cylinder shape has a circular cross-section.

5. The reactor according to claim 1, wherein the lining has a maximum radial thickness of 1 mm.

6. The reactor according to claim 1, wherein the lining comprises tantalum.

7. The reactor according to claim 6, wherein tantalum is a main component of the lining.

8. The reactor according to claim 1, wherein the connection seam comprises a weld seam.

9. The reactor according to claim 1, further comprising a protective strip arranged between the connection seam and the inner surface.

10. The reactor according to claim 9, wherein the protective strip is formed from a same material as the lining.

11. The reactor according to claim 9, wherein at least one of the lining and the at least one wall section in a region of the connection seam comprise a shaping structured to form a hollow space in which the protective strip is arranged.

12. The reactor according to claim 11, wherein the protective strip is arranged at a distance from at least one boundary wall of the hollow space.

13. A method of forming a reactor comprising:
    inserting a lining, which comprises at least two parts, into an interior space bounded by at least one wall section having an inner surface, so that the lining is arranged on the inner surface of the at least one wall to face the interior space,
    connecting the at least two parts to one another by a connection seam; and
    applying a negative pressure to a space between the inner surface and the lining connection seam via at least one fluid connection running through the at least one wall section in a region of the connection seam.

14. The method according to claim 13, wherein the lining comprises tantalum.

15. The method according to claim 14, wherein the lining has a maximum radial thickness of 1 mm.

16. The method according to claim 13, wherein, before connecting the at least two parts to one another, the method further comprises arranging a protective strip between the inner surface and a location for the connection seam.

17. The method according to claim 16, further comprising:
    forming a shaping in at least one of the lining and the at least one wall section in a region of the location for the connection seam to form a hollow space; and
    arranging the protective strip in the hollow space.

18. A reactor comprising:
    at least one wall section having an inner surface bounding an interior space;
    a lining arranged on the inner surface of the at least one wall to face the interior space;
    at least one fluid connection, to which a negative pressure is appliable, is structured to run through the at least one wall section to open into a space between the inner surface and the lining, wherein the lining comprises at least two parts connected to one another by a connection seam and the at least one fluid connection is arranged in a region of the connection seam; and
    a protective strip arranged between the connection seam and the inner surface,
    wherein at least one of the lining and the at least one wall section in a region of the connection seam comprise a shaping structured to form a hollow space in which the protective strip is arranged, and the protective strip is arranged at a distance from at least one boundary wall of the hollow space.

19. The reactor according to claim 18, wherein the lining, under an applied negative pressure via the at least one fluid connection, bears against the inner surface.

20. The reactor according to claim 18, wherein the inner surface and the lining have cylinder shapes.

21. The reactor according to claim 20, wherein the cylinder shape has a circular cross-section.

22. The reactor according to claim 18, wherein the lining has a maximum radial thickness of 1 mm.

23. The reactor according to claim 18, wherein the lining comprises tantalum.

24. The reactor according to claim 23, wherein tantalum is a main component of the lining.

25. The reactor according to claim 18, wherein the connection seam comprises a weld seam.

26. The reactor according to claim 18, wherein the protective strip is formed from a same material as the lining.

27. A method of forming a reactor comprising:
    inserting a lining into an interior space bounded by at least one wall section having an inner surface, so that the lining is arranged on the inner surface of the at least one wall to face the interior space,
    wherein the lining comprises at least two edges connected to one another by a connection seam, wherein at least one of the lining and the at least one wall section comprises, in a region of the connection seam, a shaping forming a hollow space between the lining and the at least one wall section, and wherein the at least one connection is arranged in a region of the hollow space;
    arranging a protective strip in the hollow space between the connection seam and the inner surface and at a distance from at least one boundary wall of the hollow space; and
    applying a negative pressure to the hollow space between the inner surface and the lining via at least one fluid connection running through the at least one wall section.

* * * * *